Aug. 26, 1924.  1,506,162

P. CATUCCI

FISHING REEL

Filed July 22, 1922

Pliny Catucci
INVENTOR

By Louis M. Sanders ATTY.

Patented Aug. 26, 1924.

1,506,162

UNITED STATES PATENT OFFICE.

PLINY CATUCCI, OF NEWARK, NEW JERSEY.

FISHING REEL.

Application filed July 22, 1922. Serial No. 576,716.

*To all whom it may concern:*

Be it known that I, PLINY CATUCCI, a citizen of the United States, residing in the city of Newark, county of Essex, and State of New Jersey, have invented a new and useful Improvement in Fishing Reels, of which the following is a specification.

In fishing reels of the type to which my present invention relates, it has hitherto been the practice, quite universally, to provide the frame or cage with some form of screw connections, either a plurality of screws or a screw ring for securing the head and back plates to the reel frame. In the use of such a reel, frequent inspection and cleaning are quite necessary to its successful operation. This necessitates the removal of the head and back plates from the frame before the spool and gears are accessible. The reels themselves are very small and the parts are quite delicate so that considerable inconvenience is experienced in making the frequent inspections necessary. The small screws are liable to be lost, or the retaining rings are liable to jam when being replaced.

It is the object of my invention to provide the head and back plates with a convenient locking device so that they may be readily removed and replaced without the usual inconvenience experienced with such devices.

Another object of my invention is to provide the spool with a detachable pinion readily separated from the spool, and yet when assembled within the reel, it is held firmly in place without liability to disarrangement. Another point in connection with the detachable pinion resides in the fact that with its use there is less liability to jamming with the driving wheel.

Other objects will be set forth in the course of the following detailed description taken in connection with the accompanying drawing, wherein.

Similar reference numerals refer to like parts throughout the specification and drawing.

Figure 1:
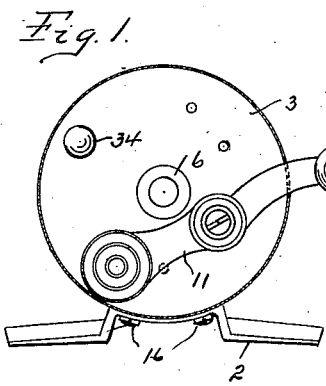
Fig. 1 is an end view of my improved reel.
Figure 2:
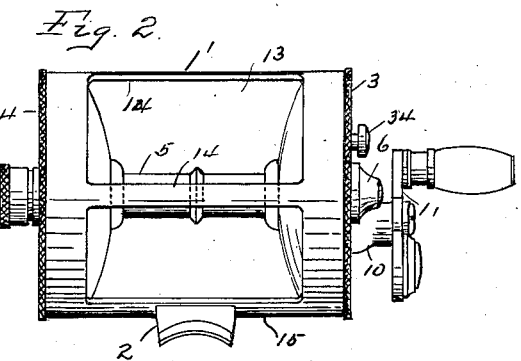
Fig. 2 is a side elevation of the same.

The reel is made up of the frame or cage 1 to which the foot plate 2 is rigidly secured, the head plate 3 and the back plate 4. The usual spool 5 is mounted to rotate in bearings 6 in the head plate and 7 in the back plate. I have not deemed it necessary to illustrate the usual click mechanism employed in such reels, since any of the ordinary click devices may be employed as desired. The head plate 3 is provided with the usual bridge 8 which supports the driving gear 9, the shaft of which extends through the bearing 10 upon the outside of the head plate and has the usual crank 11 secured thereto. The spool 5 is provided with the pinion 12 which when the parts are assembled, engages the driving wheel 9 and is driven thereby.

Figure 3:
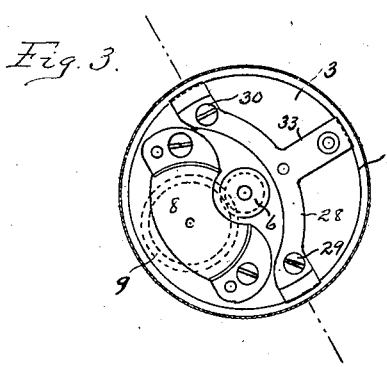
Fig. 3 is an inside elevation of the head plate showing the location of the locking member mounted thereon.
Figure 4:
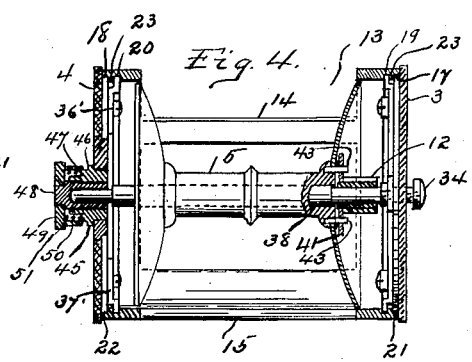
Fig. 4 is a longitudinal section of the reel frame and back plate with the head plate shown in edge elevation.
Figure 6:
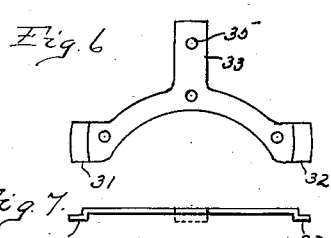
Fig. 6 is a detached plan view of the head plate locking member.
Figure 7:
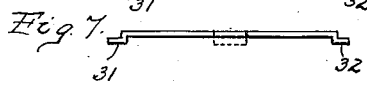
Fig. 7 is an end view of the same.

The frame 1 is made of heavy tubing of suitable size for the purpose; the sides are cut out as at 13 to form the connecting posts 14 and the foot plate post 15 to which the foot plate 2 is rigidly secured by means of the screws 16. The ends of the frame are provided with the recesses 17, 18 and the grooves or channels 19, 20, extending circumferentially around the interior of the frame. The head and foot plates 3 and 4 are plain discs of metal of suitable thickness for the purpose and each respectively provided with shoulders 21, 22 which are turned down from the inner faces of the disc so as to fit the recesses respectively 17, and 18. The narrow tongue 23, between the recess 17 and the groove 19 in the head end of the frame is cut away at diametrical points as at 24, 25 and also at the two points 26, and 27. The cutaway part at 26 being slightly wider than that at 27. Upon the inner face of the head plate is located the arc shaped locking member 28, being secured to said head plate by means of the two screws 29, 30. This member is made of thin sheet metal stamped out in the form illustrated in the Figs. 6 and 7 with the offset ends 31, 32, the degree of such offset being just about equal to the thickness or width of the tongue 23 between the recess 17 and the groove 19. The arcing of the member between the ends is for the purpose of clearing the spool pinion 12. The total length of the member 28 between its offset ends 31 and 32 is equal to the total diameter of the groove 19, so that, when it is attached to the head plate as shown in Fig. 3, and the ends of the locking members brought into registry with the cutout recesses 24 and 25, the ends 31 and 32 will register with said openings and the device may be turned circumferentially so that the offset ends 31 and 32 will engage in the groove. At the middle of the locking member 28, is the spring arm 33 which normally lies flat against the inner face of the back plate and when the offset ends 31 and 32 are brought into registry with the recesses 24 and 25, the end of the arm 33 will register with the recess 26, but will also register with the cutaway end of the tongue 23.

Figure 5:
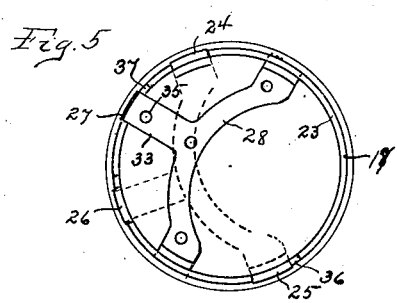
Fig. 5 is an end elevation of the reel frame showing the locked position of the locking member in full lines and the unlocked position in dotted lines.
Figure 8:
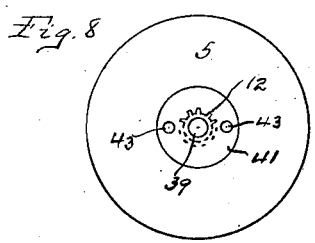
Fig. 8 is an end view of the spool showing the detachable pinion mounted thereon.
Figure 9:
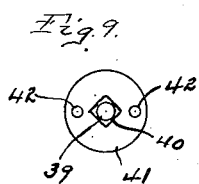
Fig. 9 is a rear view of the pinion support.

If, now, the end of the arm 33 is depressed into registry with the groove 19, the head plate may be turned into the position shown in full lines in Fig. 5, at which point the end of the arm 33 will register with the recess 27 and snap into said recess with the edges of said arm locked against the cutaway ends of the tongue 23, thus locking the head plate into firm engagement with the end of the frame 1. The means for depressing the arm 33 into registry with the groove 19 preparatory to turning the head plate upon the end of the frame, consists of a small push pin 34, projecting through an aperture in the head plate 3 and secured in the aperture 35 in the end of the arm 33, so that, when the offset ends 31 and 32 and the arm 33 are brought into registry with the recesses 24, 25 and 26 respectively, it is only necessary to depress the push pin 34 and at the same time, turn the head plate by grasping its knurled edge so as to swing said head plate and its locking member from the position shown in dotted lines to the position shown in full lines in Fig. 5 and then releasing the push pin 34 when the head plate will be firmly locked to the frame. In order that the end of the arm 33 may be brought into registry with the grooves 26 and 27, without having to "feel around" for the same, I provide a stop 36 in the groove 19 immediately adjacent to the recess 25 and another stop 37 immediately adjacent to the groove 27, so that when the member 28 is turned to either of its limiting positions, the projecting ends of the locking member will properly register respectively with the recesses 24, 25, 26 or 27 as the case may be.

Since the removal of the head plate alone is sufficient to gain access to all parts of the reel, it is unnecessary that the back plate be provided with means for detachably locking the same to the frame, and it may be permanently fixed in place by means of the two offset pieces 36', 37', which are held in place by means of the screws as shown, firmly clamping their offset ends in the groove 20.

As a means for detachably mounting the pinion 12 upon the end of the spool spindle 38, the following structure is used. The pinion itself is made of what is known in the art as pinion rod. The pinions are cut from such a rod in suitable lengths and centrally bored as at 39 so as to readily slip over the reduced end of the spindle 38. The inner end of the pinion is then squared as at 40 to fit a corresponding hole in the center of a disc 41. The disc is provided with a pair of diametrically located apertures 42 which fit over a pair of pins 43, projecting from the end of the spool body. These pins may be permanently set in the end of the spool body, or they may be in the form of small cap screws, screwed into the pool body with said head projecting a sufficient distance to permit the apertures 42 to slip over them. When the pinion 12 is in place on the spool spindle and the spool properly assembled in the fishing reel there is no danger of its escaping while at the same time the slight looseness of the parts renders the liability of the gear 9 and pinion 12 to bind or cramp during operation is completely obviated.

Another slight improvement in the reel resides in the means for taking up end play in the spool spindle. This is accomplished by means of the adjustable bearing 7 located on the back plate 4. The back plate is provided with an internally threaded bushing 45 rigidly secured in the center of the back plate. This bushing is provided with the external shoulders 46 and 47. The journal for the pivot end of the spool spindle 38 consists of an externally threaded member 48 to fit the internally threaded bushing 45, said member being provided with the journal socket or cavity and the cap 49, said cap having a skirt 50 of a size to fit over the shoulder 47 so as to leave an internal spring cavity in which the coil spring 51 is located, said spring bearing upon the shoulder at one end and inside of the cap 49 at the other end. By screwing the journal and cap into the sleeve until the end of the journal cavity abuts against the end of the spindle pivot, all end play of the spool can be taken up, while the strong tension of the compressed spring 51 will prevent the cap and journal from turning to destroy such adjustment.

I claim:

1. In a fishing reel, the combination of a cylindrical reel frame, having a recess in the end thereof, an internal circumferential groove spaced from said recess to form a circumferential tongue between said groove and recess, a head plate fitted into said recess and a locking member secured to said head plate and having offset ends at diametrical points for engagement with and rotation in said groove, said locking member having a rigid arm thereon for engagement with said tongue, whereby, said head plate may be locked to the ends of said reel frame.

2. In a fishing reel, the combination of a cylindrical reel frame and a head plate recessed into the end of said reel frame, a circumferential groove internally located in said reel frame to form an intervening tongue between said groove and recess in the frame, said tongue being cut away at diametrical points to form connecting channels between said recess and groove, a locking member, having diametrical offset ends secured to the under face of said head plate, whereby said head plate may be fitted into said recess with said offset ends of the locking members entering said channels to register with said groove and by a rotative movement to engage same to lock said head plate to said reel frame.

3. In a fishing reel, the combination of a cylindrical reel frame and a circular head plate, an inwardly directed circumferential tongue at the end of said frame, said tongue having a plurality of cross channels therein, a locking member secured to the inner face of said head plate, said locking member having offset ends and a spring arm thereon, each adapted to register with and pass through said tongue channels, whereby, a rotative movement of said head plate will cause said offset ends and spring arm to engage said tongue and secure said head plate to the end of the reel frame.

4. In a fishing reel, the combination of a cylindrical frame, an inwardly directed circumferential tongue within the end of said frame, said tongue having a plurality of cross channels therein, a head plate, a plurality of projections and a spring arm upon the head plate adapted to register with and pass through said channels, whereby the rotative movement of said head plate with respect to said frame will cause said projection to engage said tongue and said spring arm to enter a cross channel and thereby secure said head plate in position upon the end of the reel frame.

5. In a fishing reel, the combination of a cylindrical reel frame, an inwardly directed circumferential tongue spaced from the end of said frame, a head plate fitted in the end of said frame against said tongue, a locking member having a pair of diametrical projections and a spring arm upon said head plate, and a pair of diametric cutaway portions forming cross channels in said tongue, said projections and spring arm adapted to register with said channels and by a rotative movement of said head plate engage said tongue to lock said head plate to the end of the reel frame.

6. In a fishing reel, the combination of a cylindrical reel frame, having an internal circumferential groove in the end thereof, an end plate fitted into the end of said cylindrical reel frame, said end plate having offset projections and a spring arm thereon to enter said groove and by a rotation movement thereof, to lock said end plate to the end of the reel frame.

7. In a fishing reel, the combination of a reel frame, having head and back plates located at the ends thereof, locking means for detachably securing said head and back plates to the ends of said frame, a spool mounted within said frame to rotate in bearings in said head and back plates, means for rotating said spool comprising a gear train including a pinion sleeved upon the spindle of said spool, said pinion having a disc secured to one end thereof, said disc having a plurality of apertures therein, a plurality of pins projecting from the end of said spool adapted to enter said disc apertures, whereby the rotation of said pinion will be directly communicated to said spool.

8. In a fishing reel, the combination of a reel frame, a spool rotatably mounted within said frame, pivot bearings for the spindle of said spool, one of said bearings comprising an internally threaded bushing rigidly secured to the back plate of the reel, said bushing having a plurality of external shoulders thereon, an externally threaded journal screwed into said bushings, said journal having a cap secured to said journal and a spring located between said cap and the shoulder of said bushing.

9. In a fishing reel, the combination of a reel frame, a spool rotatably mounted within reel frame, pivot bearings for the spindle of said frame, pivot bearings for the spindle of said spool, one of said bearings comprising said spool, an internally threaded bushing rigidly secured to the back plate of the reel, said bushing having a plurality of external shoulders thereon, an externally threaded journal screwed into said bushing, said journal having a skirted cap secured to said journal and a spring located within the skirt of said cap and bearing upon the external shoulder of said bushing.

PLINY CATUCCI.